United States Patent [19]

Golovoy

[11] 4,081,338
[45] Mar. 28, 1978

[54] METHOD OF BREAKING AN OIL-IN-WATER EMULSION

[75] Inventor: Amos Golovoy, Inkster, Mich.

[73] Assignee: Ford Motor Company, Dearborn, Mich.

[21] Appl. No.: 754,923

[22] Filed: Dec. 27, 1976

[51] Int. Cl.² .............................................. C02B 1/82
[52] U.S. Cl. .................................. 204/149; 204/152; 204/186; 210/13
[58] Field of Search ............... 204/149, 152, 130, 186; 210/13, 44

[56] References Cited

U.S. PATENT DOCUMENTS

| 3,826,725 | 7/1974 | Schick et al. | 204/149 |
| 3,892,640 | 7/1975 | Furuta | 204/149 |
| 3,959,131 | 5/1976 | Ramirez et al. | 204/149 X |

*Primary Examiner*—Arthur C. Prescott
*Attorney, Agent, or Firm*—William E. Johnson; Keith L. Zerschling

[57] ABSTRACT

This disclosure is directed to a method of breaking an oil-in-water emulsion. Briefly, the method includes the steps of adjusting the pH of the oil-in-water emulsion to a pH in the range of 6 to 10. At least one part per million of a cation selected from $Fe^{+2}$, $Fe^{+3}$, $Al^{+3}$, $Cu^{+1}$ and $Cu^{+2}$ is added to the oil-in-water emulsion. Thereafter, the oil-in-water emulsion is treated with a dissolvable iron electrode, the electrode being dissolvable by transmitting an electric current thereto. Sufficient electric current is transmitted through the electrode to develop a ferrous ion/oil weight ratio of at least 0.02. After treatment by the dissolvable electrode, the oil-in-water emulsion is held until the emulsion breaks.

6 Claims, 1 Drawing Figure

U.S. Patent  March 28, 1978  4,081,338
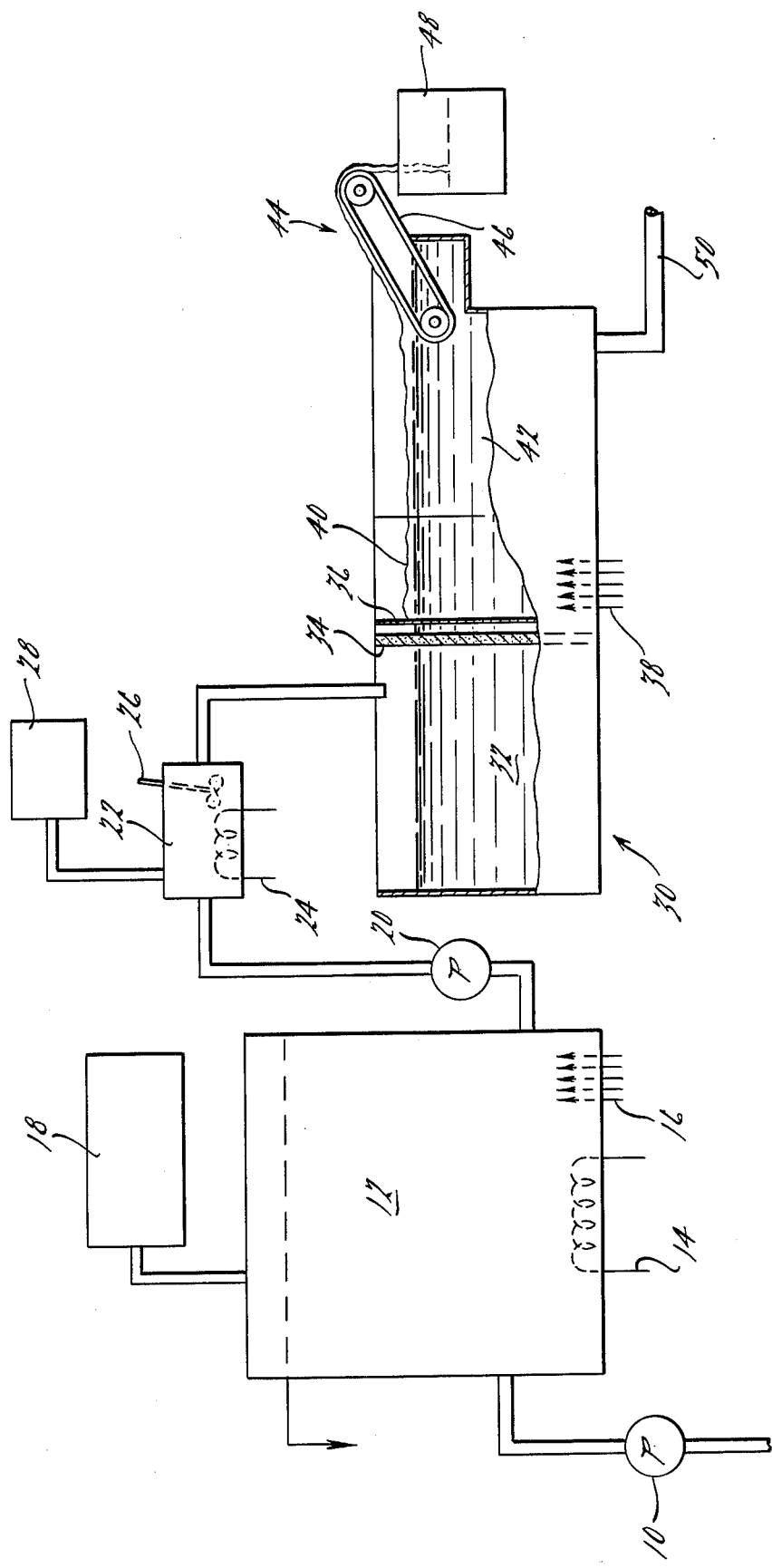

METHOD OF BREAKING AN OIL-IN-WATER EMULSION

BACKGROUND OF THE INVENTION

U.S. Pat. No. 3,523,891 for Electrolytic Sewage Treatment System And Process discloses an apparatus in which a dissolvable iron electrode is employed to treat sewage wastes. The system includes spaced metal electrode plates connected to a power supply for producing multi-valent metallic ions and hydroxyl ions during treatment of waste waters. The metallic and hydroxyl ions form a floc which floats to the surface of the cell and entraps suspended solids forming a supernatant frothy sludge.

I have recently been working in the field of electrolytic treatment of oil waste water in an effort to decrease the cost and increase the production capacity and efficiency of such treatment systems. I have found that when one treats oily waste waters by dissolving iron electrolytically into such waste waters, it is necessary generally to have a ferrous ion to oil weight ratio of about 0.05 in order to get good separation. As this high ferrous ion to oil ratio, it is, of course, necessary to expend a good deal of electrical energy in order to obtain the required amount of dissolved iron in the wastes. The cost of purchasing power to dissolve the iron has to be taken into account as a part of the overall cost of the process.

Another important item is the time of processing. For example, to break a typical emulsion of oil waste water effectively within a thirty-minute period, the ferrous ion to oil weight ratio produced by the dissolved iron electrode has to be in excess of 0.05. When the ferrous ion to oil weight ratio is about 0.035, it takes well over twenty-four hours to break the emulsion and obtain water of acceptable quality. It must be kept in mind that the breakup time is measured from the time that the oil emulsion has the specified amount of iron therein.

It is an object of my invention to provide a method for increasing the rate at which an emulsion of oil in water will break at lower ferrous ion/oil concentrations.

It is a further object of my invention to provide a method of breaking oil-in-water emulsions which is simple and efficient in operation, and economical to carry out because of reduced power requirements.

SUMMARY OF THE INVENTION

This invention relates to a method of breaking an oil-in-water emulsion and, more particularly, to a method of breaking an oil-in-water emulsion which is simple and efficient in operation and allows such oil-in-water emulsions to be broken at a lower ratio of ferrous ion to oil than is known in the art within reasonable periods of time.

Briefly, what I have developed is a method of breaking an oil-in-water emulsion in which I add at least one part per million of a cation selected from the group of cations consisting essentially of ferrous, ferric, aluminum, cuprous or cupric to the oil-in-water emulsion prior to treating that emulsion with a dissolvable iron electrode. I have found that by adding such a cation prior to treating with the dissolvable iron electrode, the oil-in-water emulsions can be broken by addition of lower amounts of iron from the dissolvable electrode and the emulsion can be broken within a reasonable period of time.

In accordance with the broad teachings of the method of my invention, an oil-in-water emulsion is broken in the following manner. The pH of the oil-in-water emulsion is adjusted to a pH in the range of 6 to 10. At least 1 part per million of a cation selected from the group of cations of ferrous, ferric, aluminum, cuprous or cupric is added to the oil-in-water emulsion. The order of adding the cation and adjusting the pH is not critical and may be interchanged. Once the emulsion has the proper pH and the cation has been added, the oil-in-water emulsion is treated with a dissolvable iron electrode. The iron electrode is dissolved by transmitting an electric current therethrough in an amount sufficient to develop in the emulsion a ferrous ion/oil weight ratio from the dissolving of the iron electrode of at least 0.02. After the iron has been dissolved from the dissolvable electrode, the oil-in-water emulsion is held in a suitable container until the emulsion breaks, e.g. separates into a clear water phase and oil sludge. I have found that emulsions which have not broken in 24 hours with a low ferrous ion/oil weight ratio will break in a very short period, generally less than thirty minutes if, for example, three to five parts per million aluminum or ferric ion are added. Thus, by adding these ions the rate at which the oily emulsion breaks increases substantially and the total amount of iron which is needed from the dissolvable electrode to break the emulsion within a short period is reduced, thereby, reducing the total power requirements to break the emulsion.

BRIEF DESCRIPTION OF THE DRAWINGS

The drawing depicts a schematic outline of a system in which the method of my invention can be practiced.

DESCRIPTION OF THE PREFERRED EMBODIMENT

Construction

The method of this invention may be applied to oil-in-water emulsions of any general type. In particular, oil-in-water emulsions utilized in machining of metal articles as a coolant and lubricant therefor may be treated by this process in order to break the emulsion and remove the oil from the water. A typical soluable oil for a typical cutting oil lubricant comprises, approximately, by weight of 79% mineral oil, 18% of a soap emulsifier and 3% of a mixture of biocidal and stabilizing agents. The cutting fluid is prepared by mixing the above-described soluble oil with water in a weight ratio of at least about 50 to 1 to form an emulsion of oil-in-water. This emulsion is directed over a metal article upon which a cutting tool is removing material. The cutting fluid cools the article being formed, flushes away the chips being generated in the cutting operation and also lubricates the surface that is being cut.

After a period of operative life, the cutting oil fluid becomes unsuitable for further use and must be discarded. The fluid may not be discarded directly because it contains oil in the water. Therefore, before it can be discarded, it is necessary to break the emulsion and thereby separate the oil from the water, permitting the clean water to be discarded and the oil to be recycled or discarded in a manner appropriate for hydrocarbon materials.

My process is one which provides an economical and efficient method for breaking oil-in-water emulsions at relatively low power requirements. The method of my invention will be best understood by considering the contents of the following description while referring to the attached drawing.

Oily waste water from a plant, such as discarded cutting oil lubricant, is delivered by means of a pump 10 to a storage tank 12. In this tank, heat and air are added by means of a heater 14 and an air delivery system 16 (schematically represented by a plurality of arrows). Any free oil which floats to the surface in the storage tank is skimmed off and removed. Also, in the receiving and storage tank, the pH of the oily waste water may be adjusted to a pH in the range of 6 to 10 by means of a pH addition system 18. The amount of material added from the pH addition system to achieve the desired pH is calculated in normal pH calculating procedures. The addition of heat and air to the storage tank is simply to keep the system at set conditions for further treatment.

A second pump 20 continuously withdraws a portion of the oily waste water held in the storage tank 12 and delivers that oil-in-water emulsion to a small processing chamber 22. This processing chamber is provided with a heater 24 and agitated by an agitator 26 both of which are not critical. The purpose of heat and agitation at this point is to continue to make sure that the oil-in-water emulsion is at set conditions for further treatment and to ensure that a salt which is added at this point is properly distributed in the emulsion.

At the processing chamber 22, a cation supply system 28 is provided for adding certain cations to the emulsion contained in the chamber. The cations are, of course, added as soluble salts such as sulfates or chlorides which produce the cations required upon dissolving. By systems well known in the art, sufficient cations are added to the emulsion to produce at least one part per million of that cation in the emulsion. The particular cations that are suitable for use are ferrous, ferric, aluminum, cuprous and cupric. The addition of ferrous or cuprous cations, of course, results in the production of the ferric or cupric cation in the solution because the lower valent ions will be oxidized to their higher valence state. It is preferred that the addition of the cation not exceed ten parts per million at this position and it is preferred that the cation be added to the emulsion in a range from 3 parts per million to 5 parts per million of solution.

After being removed from the processing chamber 22, the emulsion is delivered to an electrolytic cell generally indicated by the numeral 30. This cell has a holding zone 32 into which the oil-in-water emulsion is initially delivered. The cell also has an iron chip anode 34 which can be formed from the metallic chips generated from any metal machining operation. This iron chip anode is slowly dissolved by the passage of electrical current therethrough. The rate at which the anode is dissolved is a positive function of the amount of current passing therethrough. The higher the current, the more iron is dissolved but, of course, the more power that is used. Each iron chip addition from time to time to this electrode chamber assures that the chamber contains sufficient iron chips for continuously carrying out the process.

After the emulsion passes through the iron anode 34, it passes throgh a cathode screen 36 which is necessary for completing the electro-chemical reaction as is well known in the art. About this position, air is added by an air supply system 38. The air supplied is in the form of tiny bubbles in order to develop a mechanism by which the oil coming out of the emulsion may be picked up and floated to the surface. The oil waste, which is an oil-iron hydroxide sludge 40, begins to form on the surface of the emulsion in an emulsion breaking zone 42 of the electrolytic cell 30. The zone is sufficiently long to permit substantially full separation of the oily waste from the water.

Near the end of the oil emulsion breaking zone 42 of the electrolytic cell 30 is provided a sludge removing system generally identified by the numeral 44. This system includes a conveyer 46 which transports the sludge 40 upwardly from the water and deposits it in a sludge receiving device 48.

Clear water is withdrawn from the bottom of the emulsion breaking zone 42 by means of a pipe 50. The water from this pipe may be pumped to a sewage system or may be recycled depending upon the requirements for process water in the plant using this system.

Operation

Having described the major components utilized in carrying out the process of my invention, I will now describe, in detail, the particular requirements of the process for obtaining breakups of oil-in-water emulsions in relatively short periods of time.

As originally indicated, the pH of the emulsion is controlled in the receiving and storage tank 12 by means of a pH addition system 18. The pH of the emulsion should be in the range from 6 to 10 and preferably, for best operation, the pH should be in a range from 6 to 8. This latter range assures the best operation of my system. While the wider pH range can be used, use of a pH in the broader range does not give as good efficiency for the process as is achieved when the pH is in the preferred range.

With respect to the addition of the particular cations enumerated, namely ferrous, ferric, aluminum, cuprous and cupric, this process is carried to the point that the oil-in-water emulsion has at least 1 part per million cation contained therein prior the treatment with the iron electrode. I have found that one should not add more than ten parts per million of such cation or a combination thereof into the emulsion. I have found that the preferred range is 3 to 5 parts per million of such cation from a salt as addition to the emulsion. Once again, my preferred range of operation would be to add 3 to 5 parts per million of the cation to an emulsion having a pH in the range from 6 to 8. One may use lower or higher cation additions and different pH's and the process will work but it does not work as efficiently as if the preferred procedure is followed.

In a previous portion of this specification, a discussion of the iron chip anode pointed out the fact that this iron anode dissolved when an electrical current was passed therethrough. When the anode dissolves, it forms a ferrous ion which is subsequently oxidized to a ferric ion in the treatment of the oil-in-water emulsion. The amount of iron dissolved as ferrous iron is a controlling factor in my method. The ferrous ion to oil ratio by weight must be at least 0.02 in order to carry out the process of this invention. It also appears that to carry out my process, one does not have to exceed a ferrous ion by dissolution of metal from the electrode to oil weight ratio of 0.05. I prefer to work with a ferrous ion to oil weight ratio of generally about 0.035. This particular level of ferrous ion addition by dissolution by the electrode appears to be the most economical from the amount of power utilized to dissolve the electrode and the processing time required to break the emulsion.

To illustrate the method of my invention, I will detail herein several examples.

One example in which the emulsion has a pH in the range of 6.5 to 7.5, the addition of 3 parts per million of cupric ion with a ferrous ion to oil weight ratio of 0.035 required only forty minutes for an oil-in-water emulsion to break. Where there was no cupric ion addition with the same ferrous ion to oil weight ratio of 0.035, the time required to break the emulsion was 24 hours. Thus, the addition of 3 parts per million of the cupric ion brought about a substantial reduction of time required to break the oil-in-water emulsion at a low ferrous ion-/oil ratio.

As another example, with the addition of ten parts per million of ferric ion to an oil-in-water emulsion in which the total iron to oil weight ratio was 0.025, the emulsion broke in twelve minutes. The total iron includes the ferric ion added as $FeCl_3$ salt and the ferrous ions added electrolytically. Without the addition of the cation, it was not possible to obtain water of acceptable quality at that iron to oil weight ratio regardless of the treatment time.

As another example, when 5 parts per million ferrous ion was added by dissolving proper amounts of $FeSO_4$ at an electrically dissolved total iron to oil weight ratio of 0.035, the emulsion was broken in fifteen minutes instead of the 24 hours required when no ferrous ion was added as a $FeSO_4$ salt.

By the addition of five parts per million aluminum cation, the treatment time of an oil-in-water emulsion having a ferrous ion to oil weight ratio of 0.022 required only ten minutes. An identical emulsion treated with the same ferrous ion to oil weight ratio but without the addition of aluminum cation was not broken regardless of treatment time.

There has been disclosed herein a method of breaking an oil-in-water emulsion which is carried out in an efficient and effective manner. The method relies upon the addition of a small amount of cation to an emulsion which is subsequently treated by a dissolvable iron electrode.

It is apparent that those skilled in the art will conceive of many modifications of this invention in view of the teachings of this specification. It is intended that all such modifications which fall within the area of my invention be included within the scope of the appended claims.

What I claim is:

1. A method of breaking an oil-in-water emulsion which comprises:
   adjusting the pH of the oil-in-water emulsion to a pH in the range of 6 to 10;
   adding to the oil-in-water emulsion at least 1 part per million of a cation or a combination thereof selected from the group of cations consisting essentially of $Fe+2$, $Fe+3$, $Al+3$, $Cu+1$ and $Cu+2$;
   treating the oil-in-water emulsion with a dissolvable iron electrode, said dissolvable iron electrode being dissolved by transmitting an electric current therethrough in an amount sufficient to develop an $Fe+2$/oil weight ratio of at least 0.02;
   holding the oil-in-water emulsion treated by said dissolvable electrode until the emulsion breaks.

2. The method of claim 1 wherein: the pH is adjusted to a pH in the range from 6 to 8.

3. The method of claim 1 wherein: the cation added to the oil-in-water emulsion is in a range of 1 parts per million to 10 parts per million.

4. The method of claim 1 wherein: the cation added to the oil-in-water emulsion is in a range from 3 parts per million to 5 parts per million, and wherein: the pH is adjusted to a pH in the range from 6 to 8.

5. The method of claim 1 wherein: the oil-in-water emulsion is treated by said dissolvable metal electrode to develop an $Fe+2$/oil weight ratio of at least 0.02 but not in excess of 0.05.

6. The method of claim 5 wherein: the oil-in-water emulsion is treated by said dissolvable metal electrode to develop an $Fe+2$/oil weight ratio of about 0.035; wherein the cation added to the oil-in-water emulsion is in a range from 3 parts per million to 5 parts per million, and wherein: the pH is adjusted to a pH in the range from 6 to 8.

* * * * *